US006759817B2

(12) United States Patent
Mersch

(10) Patent No.: US 6,759,817 B2
(45) Date of Patent: Jul. 6, 2004

(54) WINDOW LIFTER SYSTEM AND METHOD OF CONTROLLING A PLURALITY OF WINDOW LIFTERS

(75) Inventor: Gerhard Mersch, Uetze (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/124,434

(22) Filed: Apr. 17, 2002

(65) Prior Publication Data

US 2002/0171384 A1 Nov. 21, 2002

(30) Foreign Application Priority Data

Apr. 18, 2001 (DE) ........................................ 101 18 982

(51) Int. Cl.[7] ................................................ H02P 7/74

(52) U.S. Cl. ......................... 318/34; 318/596; 318/599; 318/684

(58) Field of Search ................................ 318/599, 596, 318/684, 34

(56) References Cited

U.S. PATENT DOCUMENTS 4,328,451 A * 5/1982 Barge ......................... 318/596
5,329,525 A * 7/1994 Sakagami ................... 370/389
5,577,043 A * 11/1996 Guo et al. .................. 370/449
6,404,158 B1 * 6/2002 Boisvert et al. ............ 318/469
6,431,153 B2 * 8/2002 Ganser et al. .............. 123/480
6,515,377 B1 * 2/2003 Ubelein et al. ............ 307/10.1
6,560,511 B1 * 5/2003 Yokoo et al. ............... 700/245

FOREIGN PATENT DOCUMENTS

DE 199 34 880 1/2001
JP 0511795 A1 * 4/1992
JP 06351067 A * 10/1993 .............. B60J/1/17
JP 06351067 12/1994

* cited by examiner

*Primary Examiner*—Rita Leykin
(74) *Attorney, Agent, or Firm*—Carlson, Gaskey & Olds

(57) ABSTRACT

A window lifter system comprises a first window lifter motor and a master control device for the first window lifter motor. The master control device is able to detect a position of a window pane driven by the first window lifter motor and to drive the first window lifter motor at a variable speed. The system further comprises at least one second window lifter motor and a slave control device for the second window lifter motor. The slave control device is able to detect a position of a window pane driven by the second window lifter motor and to drive the second window lifter motor at a variable speed. A bus system is provided by means of which the master and slave control devices are able to communicate with each other. There is also proposed a method of controlling such a window lifter system.

17 Claims, 4 Drawing Sheets

WINDOW LIFTER SYSTEM AND METHOD OF CONTROLLING A PLURALITY OF WINDOW LIFTERS

This application claims priority to the Federal Republic of Germany Patent application serial number 101 18 982.6 filed on Apr. 18, 2001.

TECHNICAL FIELD

The invention relates to a window lifter system as well as to a method of controlling a plurality of window lifter motors.

BACKGROUND OF THE INVENTION

In many motor vehicles equipped with electrical window lifters, there is realized a comfort function by means of which all window panes can be closed simultaneously. Due to the fact that on moving the window panes there may prevail differing conditions at the various vehicle doors of one and the same vehicle, for instance differing conditions in terms of friction, differing lengths of travel and differing weights of the window pane, too, there may occur the phenomenon that the closing action of the individual panes, in the event that they are to be closed simultaneously, is terminated at different points in time. Such phenomenon may also be caused by the circumstance that the vehicle manufacturer combines different variants of the window lifter motor from various suppliers. The different variants of the window lifter motor are not identical with respect to their characteristics and, hence, result in differing speeds of travel of the window pane. Closing actions that deviate from each other despite an identical starting position are felt by the end user to be a nuisance.

Therefore it is the object of the invention to provide a window lifter system as well as a method of controlling a plurality of window lifter motors, by means of which a simultaneous closing action of the window panes is assured, independently of the marginal conditions being present at the individual window panes.

BRIEF SUMMARY OF THE INVENTION

To this end, there is provided according to the invention a window lifter system comprising a first window lifter motor and a master control device for the first window lifter motor, the master control device being able to detect a position of a window pane driven by the first window lifter motor and to drive the first window lifter motor at a variable speed, at least one second window lifter motor and a slave control device for the second window lifter motor, the slave control device being able to detect a position of a window pane driven by the second window lifter motor and to drive the second window lifter motor at a variable speed, and a bus system by means of which the master and slave control devices are able to communicate with each other. In this system, the master control device presets the speed at which the window pane associated to it is being closed. This speed information is given to each slave control device which for its part takes care that the window pane associated to it is closed at the same speed.

The method according to the invention for simultaneously closing all the window panes is distinguished by the following steps: First, the master control device moves the window pane driven by it at a speed which lies below an achievable maximum speed, from a fully open position into a fully closed position. In so doing, there is measured the time which is needed for fully closing the window pane. The measured time is transferred to the slave control device as a set time and is stored there. The slave control device compares the set time with the actual time needed for the last closing action of the window pane driven by it, and appropriately corrects the drive speed. The corrected drive speed is stored and is used for the next closing action of the window pane. In this method, the speed of travel of the window panes associated to the slave control devices is updated whenever the window pane associated to the master control device is brought from the fully open position into the fully closed position.

According to a preferred embodiment of the invention it is provided for that the control devices have a semiconductor bridge circuit in order to feed current into an associated window lifter motor in a pulse-width modulated fashion. This makes it possible for the control device to drive the window lifter motor at a variable speed. Preferably, the master control device drives the window lifter motor with an ON/OFF ratio of approximately 80%. This is a good trade-off between the high speed of travel which is striven for, on the one hand, and the must of leaving sufficient scope for a higher ON/OFF ratio, on the other. This higher ON/OFF ratio is needed to achieve the same speed of travel as with the window pane of the master control device, if the resistance to travelling of the window pane associated to one of the slave control devices is higher than the resistance to travelling of the window pane associated to the master control device.

For the bus system, a CAN bus system may be used or a bus system that is based on Bluetooth technology.

According to a preferred embodiment of the invention, it is provided for that the window lifter motor has a Hall effect sensor by means of which the associated control device is able to detect the absolute position of the driven window pane. This makes it possible for the control device to monitor the speed of travel of the window pane driven by the associated window lifter and to adapt the ON/OFF ratio for the window lifter motor such that there is achieved a constant speed of travel. It is in this way that despite an enhanced friction in a certain range of travel of the window pane, for example, there can be achieved a constant speed of travel by increasing the ON/OFF ratio of the window lifter motor whenever the window pane is in the region with enhanced friction.

According to an alternative, simpler embodiment there may be provided for that the control device is able to detect the acquisition of a fully open position and a fully closed position of the associated window pane with the aid of the current consumption of the respective window lifter motor. Also with this embodiment, it is ensured that the time which is needed to bring each window pane from the fully open position into the fully closed position, is always the same. There can not be guaranteed, however, that the window panes always move at the same speed between the fully open and fully closed position.

It is preferably provided for that the control device is directly mounted to the associated window lifter motor. This results in a compact assembly unit. As an alternative, it may be provided to arrange the control device so as to be remote from the associated window lifter motor. This suggests itself in particular if the control device is a slave control device and controls more than one window lifter motor.

Preferably, it is provided for that the master control device is associated to the window pane of the driver's door of the vehicle. This window is usually actuated most frequently, so that concerning the window pane of the driver's door there exists the greatest probability to gain a current value for the speed of travel from the fully open into the fully closed position. As with each actuation of the window pane of the driver's door this current value is transferred to the slave control devices of the other window panes, the slave control devices have a current value even if they have not been actuated over a longer period of time.

If the slave control device does not have an actual time from the last closing action of the window pane driven by it, it drives the window lifter motor associated to it preferably likewise at an ON/OFF ratio of approximately 80% in a pulse-width modulated fashion. This guarantees, on the one hand, that all windows are moved approximately at the same speed on the first actuation thereof. On the other hand, a sort of "emergency running properties" is provided, at the presence of which all windows will be closed with approximately the same speed if no current set value is preset by the master control device.

Advantageous designs of the invention will be apparent from the sub-claims.

DETAILED DESCRIPTION OF THE PREFERRED EMBODIMENTS

Figure 1:
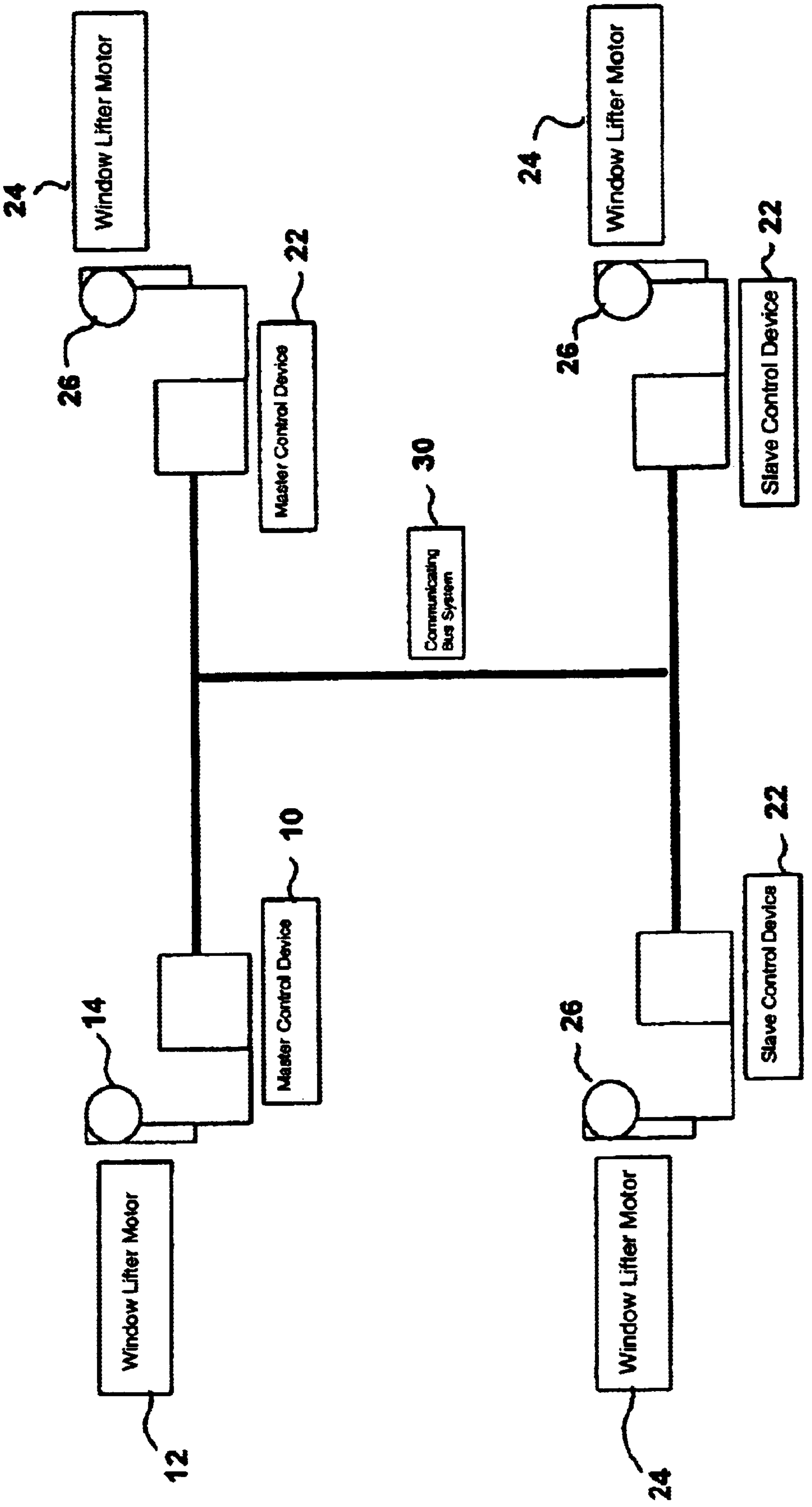
FIG. 1 shows schematically a block diagram of a window lifter system according to the invention.

In FIG. 1 there is shown a window lifter system according to the invention. It comprises a master control device 10 and a window lifter motor 12 associated to the master control device. Mounted to the window lifter motor 12 is a position transmitter 14 which is comprised of a Hall effect sensor 16 provided on a circuit board 15 and of a ring magnet 18 provided on a motor shaft 20 of the window lifter motor 12. Due to the position transmitter 14, the master control device 10 is able to detect the absolute position of a window pane driven by the window lifter motor 12.

The window lifter system also has three slave control devices 22, associated to which are window lifter motors 24 having position transmitters 26. The position transmitters 26 have a construction identical to that of position sensor 14.

Preferably, each of the control devices 10, 22 is installed in the corresponding door of the vehicle, the master control device 10 being arranged in the driver's door and the slave control devices being arranged in the passenger's door and the rear doors of the vehicle, respectively.

Figure 2:
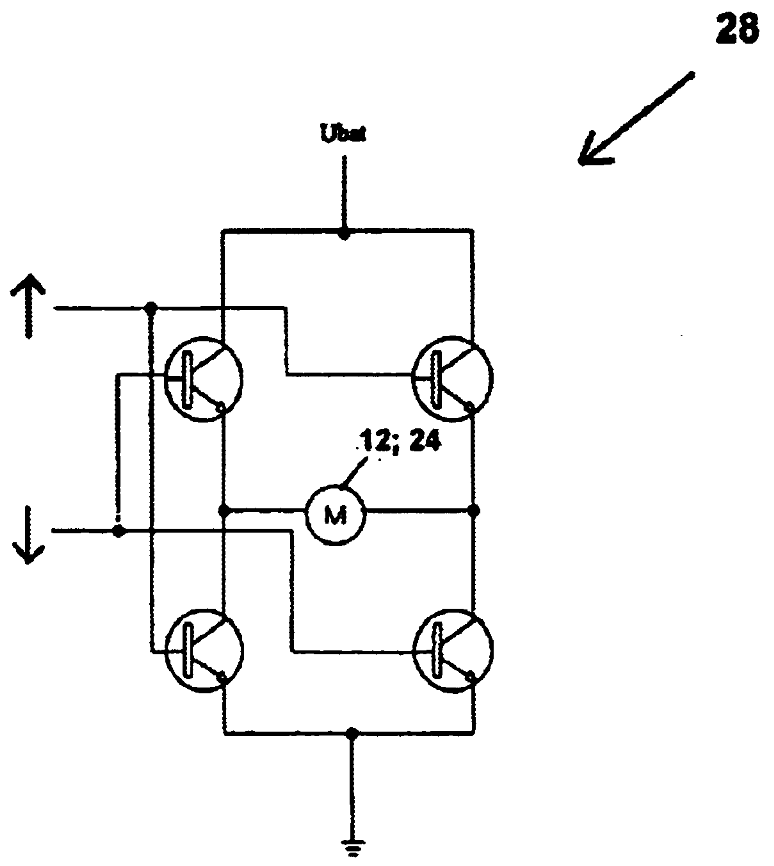
FIG. 2 shows the circuitry of a semiconductor bridge circuit for feeding current into a window lifter motor used in the window lifter system.
Figure 3:
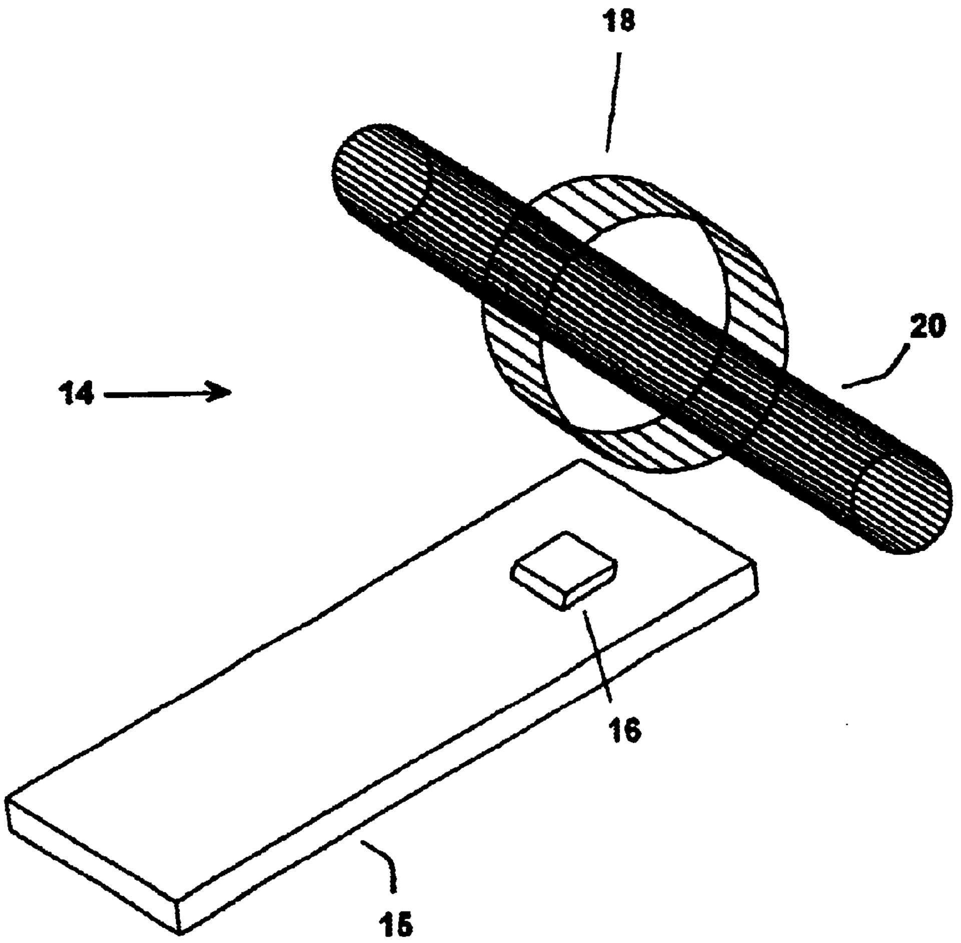
FIG. 3 shows schematically a sensor for detecting the position of a window pane driven by a window lifter motor.

Each control device 10, 22 controls by pulse width modulation the window lifter motor 12, 24 associated to it. To this end, each control device has a semiconductor bridge circuit 28 (see FIG. 2), by means of which current can be fed into the associated window lifter motor. The pulse-width modulated input signals required for lifting and lowering the window pane are represented by an arrow pointing upwards and downwards, respectively.

As can be seen in FIG. 1, the control devices 10, 22 communicate via a bus system 30 which in this arrangement is a CAN bus system.

Figure 4:
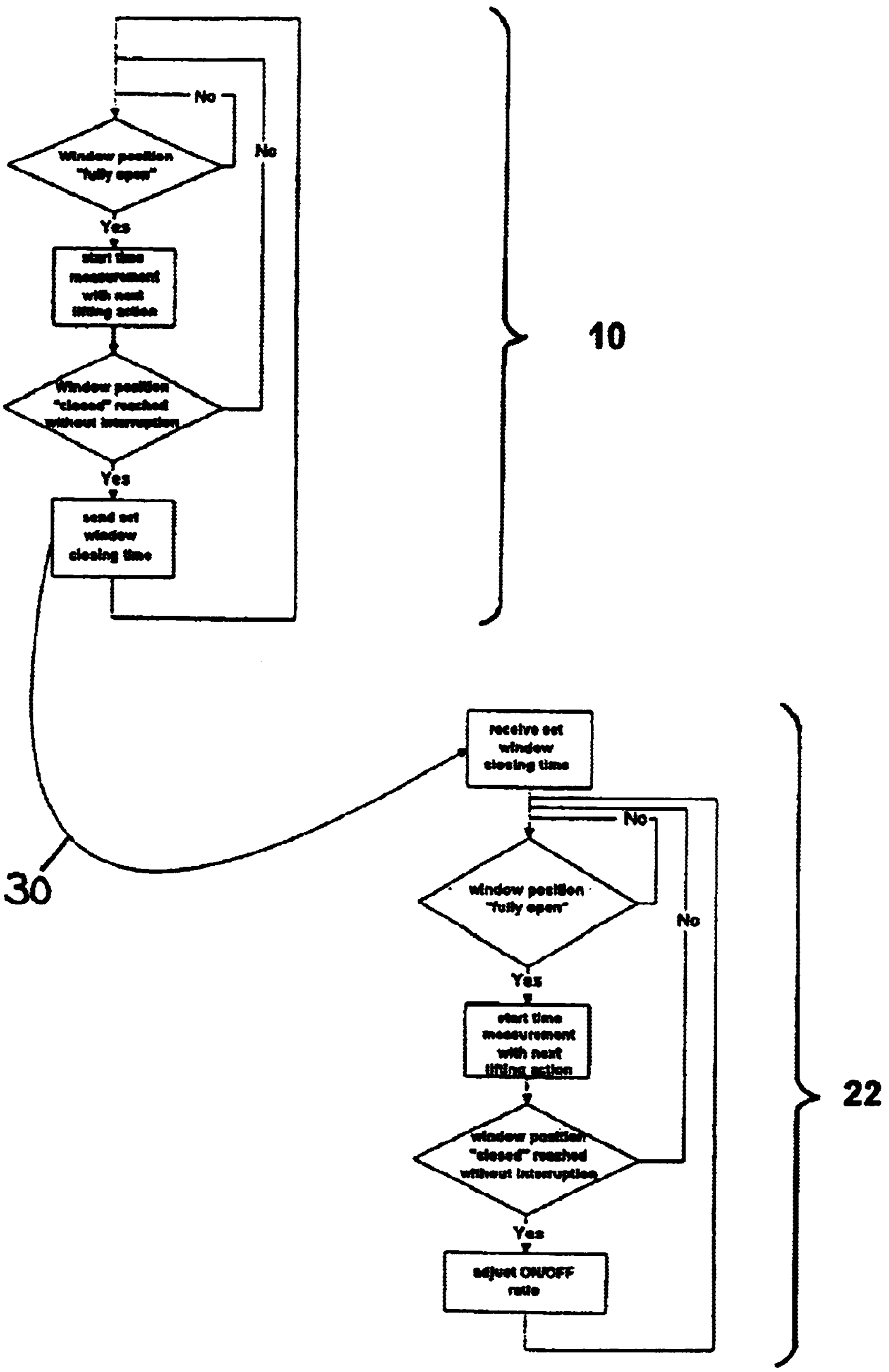
FIG. 4 shows a flow diagram of the method according to the invention.

The operational mode of the window lifter system described will now be described by means of FIG. 4, in which there are shown the method steps proceeding in the master control device 10 as well as those steps that are performed in the slave control device 22 communicating with the master control device 10 via CAN bus system 30.

With every closing action of the window, the master control device 10 tries to determine an actual value for the travelling time of the window pane from the fully open position into the fully closed position. To this end, there will be interrogated first whether the window is in the fully open position. If this is true, a time measurement begins with the next lifting action. If the window pane is stopped before it has reached the fully closed position, the measured value is rejected. If it happens, however, that the fully closed position is reached, the measured actual time for completely closing the window is transferred as set time to the slave control devices 22.

If the window pane associated to a slave control device is being closed, the slave control device tries to check whether the window pane is closed with the correct speed. Since that checking can be done only if the window pane is in the fully open position at the start of the closing action, this will be interrogated at first. If this is true, there will be measured the time for completely closing the window pane. If closing is stopped before the fully closed position is reached, the measured value is rejected. Otherwise, the measured value is compared with the set time received from the master control device. If there is a deviation, the ON/OFF ratio is corrected in such a way that the correct set value is presumably reached with the next closing action of the window. The adjusted ON/OFF ratio is stored.

If there is no set value for the window closing time available on the first closing action of a window pane associated to a slave control device, the slave control device 22 feeds current into the window lifter motor 24 associated to it with the same ON/OFF ratio as does the master control device, i.e. an ON/OFF ratio of 80%.

The described process of determining the actual values for the window closing time through the master control device and transmitting this value as set value to the slave control devices is done each time the window pane associated to the master control device 10 is moved from the fully open position into the fully closed position. It is in this way that the actual set time is available to the slave control devices 22 at any time.

Since due to the position transmitter 14 each control device 10, 22 knows the absolute position of the window pane during the closing action, the speed of travel of the window pane may additionally be monitored. In order to ensure a constant travel of the window pane, each control device dynamically adapts the ON/OFF ratio in such a manner that a constant speed of travel of the window pane is achieved, which is independent of, for example, a local sluggishness of the window pane.

According to one further development of the invention there may be provided for that the slave control devices deliver return information to the master control device in the event that the window closing time preset by the master control device can not be achieved even by increasing the ON/OFF ratio for the window lifter motors 24. With the next closing procedure of the window pane associated to it, the master control device then will take a lower value for the ON/OFF ratio instead of the provided standard ON/OFF ratio of, for instance, 80%.

What is claimed is:

1. A window lifter system comprising a first window lifter motor and a master control device for said first window lifter motor, said master control device being able to detect a position of a window pane driven by said first window lifter motor and to drive said first window lifter motor at a variable speed, at least one second window lifter motor and a slave control device for said second window lifter motor, said slave control device being able to detect a position of a window pane driven by said second window lifter motor and to drive said second window lifter motor at a variable speed, and a bus system by means of which said master and slave control devices are able to communicate with each other.

2. The window lifter system according to claim 1, wherein said master and slave control devices have a semiconductor bridge circuit in order to feed current into an associated window lifter motor in a pulse-width modulated fashion.

3. The window lifter system according to claim 1, wherein said bus system is a CAN bus system.

4. The window lifter system according to claim 1, wherein said bus system is based on Bluetooth technology.

5. The window lifter system according to claim 1, wherein said first and second window lifter motors have a Hall effect sensor by means of which an associated control device is able to detect an absolute position of a driven window pane.

6. The window lifter system according to claim 1, wherein said master and slave control devices are able to detect an acquisition of a fully open position and a fully closed position of an associated window pane with the aid of a current consumption of a respective window lifter motor.

7. The window lifter system according to claim 1, wherein said master and slave control devices are each directly mounted to an associated window lifter motor.

8. The window lifter system according to claim 1, wherein said control device is provided so as to be remote from an associated window lifter motor.

9. The window lifter system according to claim 8, wherein said control device is a slave control device and controls more than one window lifter motor.

10. The window lifter system according to claim 1, wherein said master control device is associated to a window pane of a driver's door of a vehicle.

11. A method of controlling a plurality of window lifter motors which constitute a window lifter system comprising a first window lifter motor and a master control device for said first window lifter motor, said master control device being able to detect a position of a window pane driven by said first window lifter motor and to drive said first window lifter motor at a variable speed, at least one second window lifter motor and a slave control device for said second window lifter motor, said slave control device being able to detect a position of a window pane driven by said second window lifter motor and to drive said second window lifter motor at a variable speed, and a bus system by means of which said master and slave control devices are able to communicate with each other, said method comprising the following steps:

said master control device moves a window pane driven by it at a speed which lies below an achievable maximum speed, from a fully open position into a fully closed position;

there is measured a time which is needed for fully closing said window pane;

said measured time is transferred to said slave control device as a set time and is stored there;

said slave control device compares said set time with an actual time needed for the last closing action of said window pane driven by it, and appropriately corrects a drive speed;

said corrected drive speed is stored and is used for the next closing action of said window pane.

12. The method according to claim 11, wherein said master control device drives said first window lifter motor in a pulse-width modulated fashion at an ON/OFF ratio of approximately 80%.

13. The method according to claim 11, wherein said slave control device drives said second window lifter motor in a pulse-width modulated fashion at an ON/OFF ratio of approximately 80%, if there is not available an actual time from said last closing action of said window pane driven by it.

14. The method according to claim 12, wherein that value of said ON/OFF ratio is stored as said actual value of said last closing action, by means of which there is achieved said set time, for said closing action, preset by said master control device.

15. The method according to claim 13, wherein that value of said ON/OFF ratio is stored as said actual value of said last closing action, by means of which there is achieved said set time, for said closing action, preset by said master control device.

16. The method according to claim 14, wherein said control devices monitor a speed of travel of a window pane driven by an associated window lifter motor and adapt said ON/OFF ratio for said window lifter motor in a dynamic way such that a constant speed of travel is achieved.

17. The method according to claim 15, wherein said control devices monitor a speed of travel of a window pane driven by an associated window lifter motor and adapt said ON/OFF ratio for said window lifter motor in a dynamic way such that a constant speed of travel is achieved.

* * * * *